Feb. 27, 1923.  
A. T. BROWN  
DRIVING AXLE CONSTRUCTION  
Filed Oct. 28, 1919

INVENTOR.  
Alexander T. Brown.  
BY Parsons & Bodell  
ATTORNEYS.

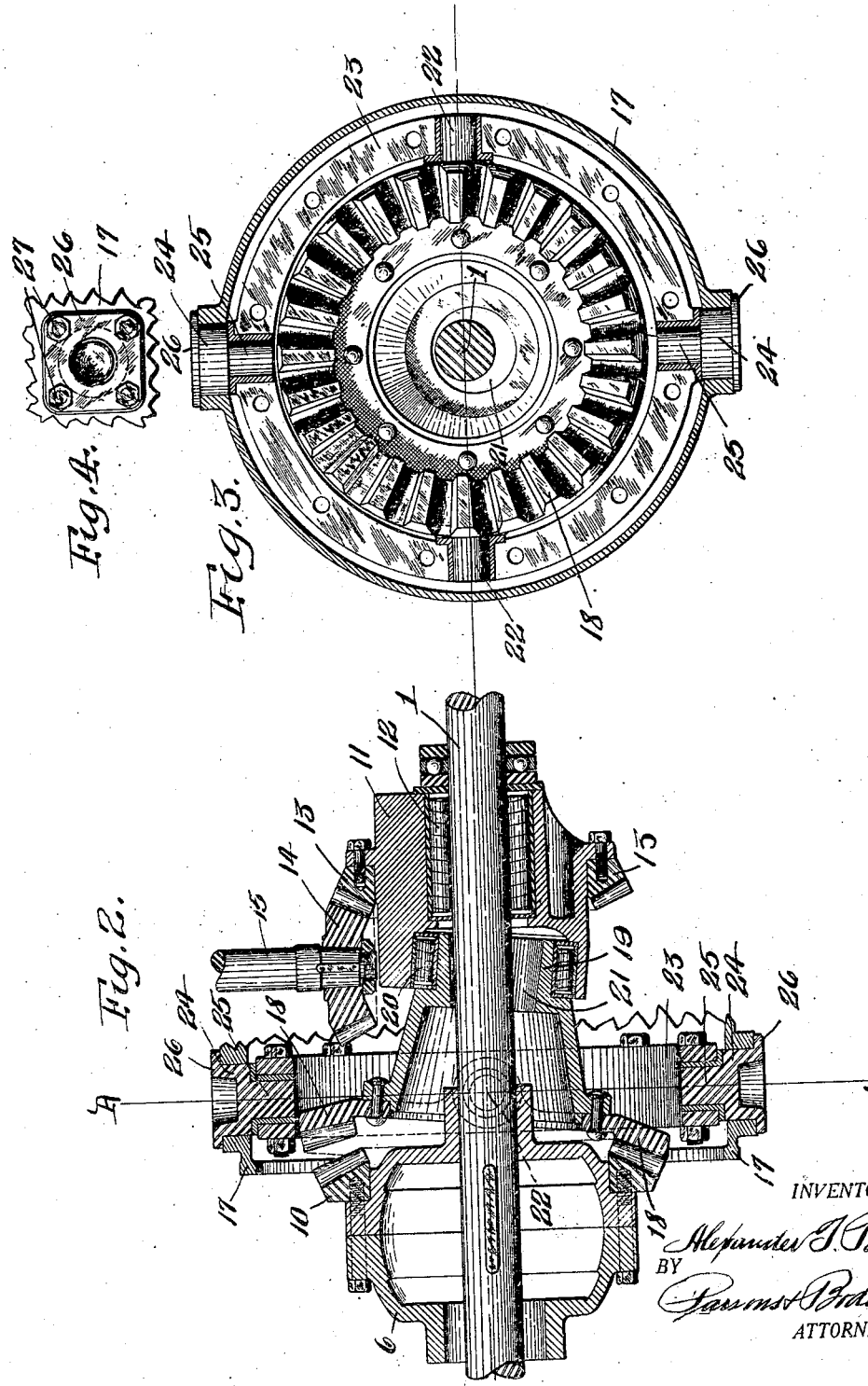

Patented Feb. 27, 1923.

1,446,827

UNITED STATES PATENT OFFICE.

ALEXANDER T. BROWN, OF SYRACUSE, NEW YORK.

DRIVING-AXLE CONSTRUCTION.

Application filed October 28, 1919. Serial No. 333,865.

*To all whom it may concern:*

Be it known that I, ALEXANDER T. BROWN, a citizen of the United States, and a resident of Syracuse, in the county of Onondaga and State of New York, have invented a certain new and useful Driving-Axle Construction; of which the following is a specification.

This invention has for its object a driving axle construction, particularly applicable where a comparatively great reduction is required between the driving and driven member, which axle construction is particularly simple in construction, compact in arrangement, economical in manufacture, and highly efficient and durable in use; and in which the gear elements are reduced to minimum number.

The invention consists in the novel features and in the combinations and constructions hereinafter set forth and claimed.

In describing this invention, reference is had to the accompanying drawings in which like characters designate corresponding parts in all the views.

Figure 2 is an enlarged fragmentary sectional view of the driving means shown in Fig. 1.

Figure 3 is a sectional view, partly in elevation taken on line A—A, Fig. 2, the wobble gear being shown in end elevation.

Figure 4 is a fragmentary plan view of one of the trunnions or pivots for the supporting frame for the wobble gear.

Figure 1:
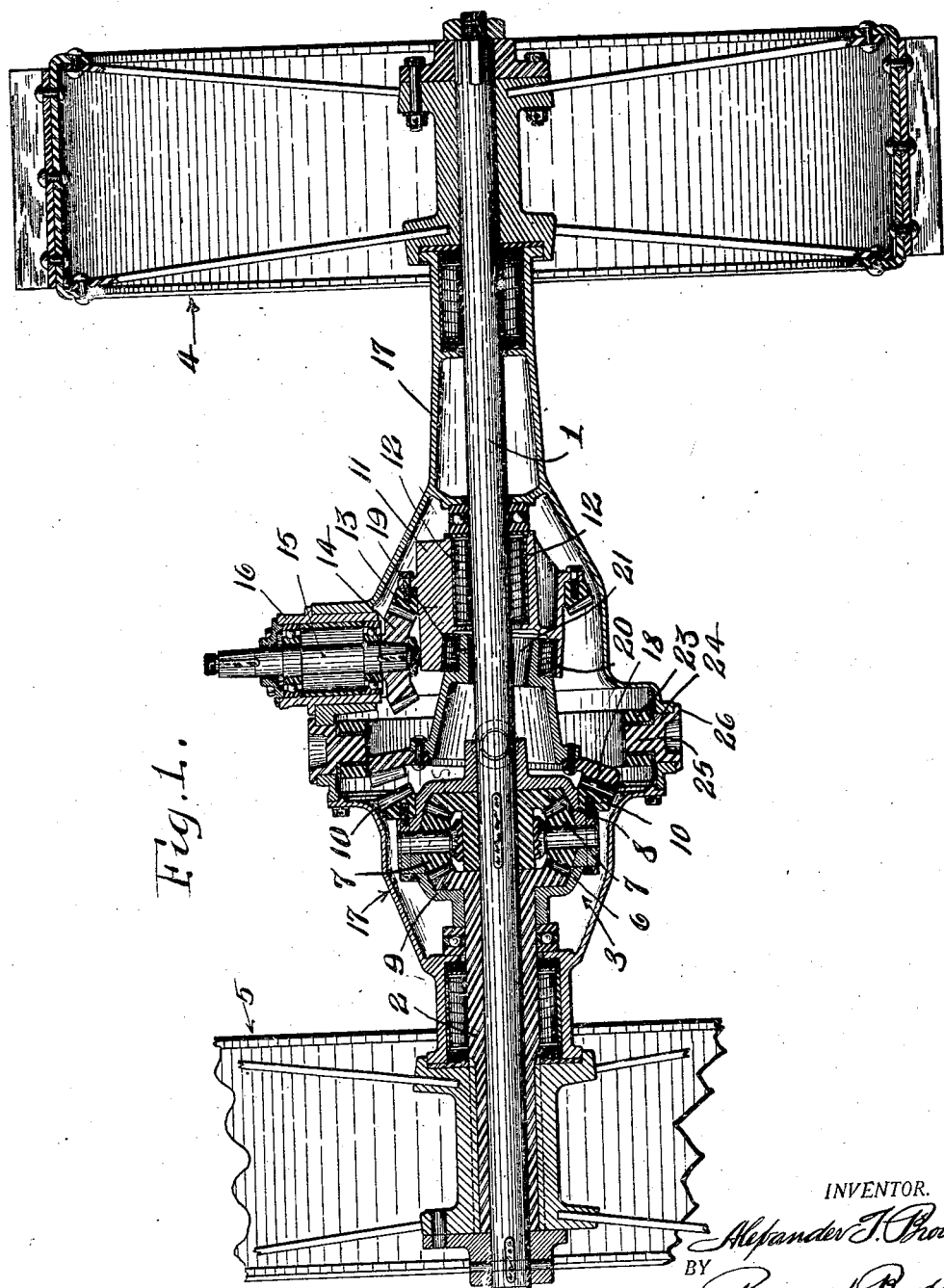
Figure 1 is a transverse sectional view of one form of driving axle construction, the drive or tractor wheels of an agricultural machine being also shown.

This rear axle construction comprises generally, an axle shaft having a gear thereon, a driving member mounted upon the axle and rotatable about the same and power transmitting means between the driving member and the gear. This power transmitting means includes, what for convenience is termed, a wobble gear, as it does not rotate but wobbles about two transverse axes arranged at a right angle to each other and extending transversely of the axis of the axle so that its gear teeth which mesh with the former gear have a slight back and forth movement about an axis extending in the direction of the axle and also a rocking movement into and out of mesh with the gear connected to the axle, it being understood that none of the teeth of the wobble gear are in mesh with the former gear at all times.

The axle is here shown as composed of two sections 1, 2, the section 1 being a shaft, and the section 2 a sleeve mounted on one end of the shaft 1, the sections being connected by differential gearing 3. The ground or tractor wheels 4, 5 of the implement in which my gearing is embodied are mounted respectively on the shaft 1 and on the sleeve 2.

The differential gearing may be of any suitable form, size and construction, and as here shown includes a casing 6 loosely mounted on the axle sections 1 and 2, compensating pinions 7 carried in the casing 6 and rotatable therewith and meshing respectively with opposite gears 8, 9 mounted respectively on the axle sections 1 and 2. A driving gear ring 10 is mounted on a casing 6. This gear ring is in the form of a bevel or crown gear.

11 is the driving member rotatably mounted on the axle and as here shown, on the section 1 thereof, suitable anti-friction bearings 12 being interposed between the member 11 and the shaft 1. The driving member 11 is provided with a suitable bevel gear ring 13 which meshes with the driving pinion 14 mounted on a shaft 15 journaled in suitable bearings carried by a support 16 mounted in the axle casing 17. The casing 17 which encloses all the gearing associated with the axle may be of any suitable form, size and construction. The support 16 is tubular and in practice is usually of such size as to occupy an opening in the casing large enough to permit the pinion 14 to pass therethrough.

18 is the wobble gear which is provided with a hollow tubular or conical body encircling the axle or section 1 thereof and being spaced apart from the same and having a hub 19 at its end remote from the gear teeth which hub extends into an eccentric or cam recess in one end of the driving member 11, suitable bearings 20 being interposed between the hub and the walls of the recess. The hub is provided with a passage 21 large enough to permit wobbling movement of the gear 18 effected by the eccentricity of the recess. Said gear 18 is pivoted on an axis extending transversely of the axis of the axle 1 and as here shown it is provided with diametrically opposite trunnions 22 which are journaled in a supporting ring or frame 23 extending around the axle and which in turn is movable about an axis extending transversely of the axle 1 and at a right angle to the axis of the trunnions 22, this ring 23 being pivoted to the casing 17. As shown in Figs. 3 and 4, the casing is formed with openings and the ring 23 with bearings alined therewith and bearing members 24 are inserted in the openings of the casing and are formed with studs 25 extending into the bearings of the ring 23.

The bearing member 24 is formed with a flange 26 overlying the casing 17 and secured thereto in any suitable manner as by machine screws 27.

In use, the shaft 15 is connected in any suitable manner to a motor as an internal combustion engine, and in operation, the member 11 is rotated about the axle by the shaft 15 and during the rotation thereof the gear 18 is caused to wobble or move about the axes of the pivots 22 and 25.

These two pivotal movements effect a wobble of the gear 18 which causes diametrically opposite portions of its face to alternately move into and out of mesh with the gear 10 and while the portion of the gear 18 in mesh with the gear 10 is progressing in one direction, the diametrically opposite portion is out of mesh with the gear 10 and is moving in a retrograde direction preliminary to being moved into mesh with the gear during the next phase of the wobble.

This transmitting mechanism is particularly advantageous in that it is compact and is entirely located in the axle casing, and further in that a large number of teeth are in mesh or in clutch at all times, thus allowing small gears for strength and a large gear reduction.

What I claim is:

1. A driving axle construction comprising an axle, a gear connected to the axle and arranged concentric therewith, a rocking support having its axis extending diametrically crosswise of the axis of the axle, a gear encircling the axle and meshing with the former gear and mounted in the support upon a transverse axis arranged at a right angle to the axis of said support, and means for rocking the latter gear about its transverse axis, said means being mounted upon the axle, substantially as and for the purpose described.

2. A driving axle construction comprising an axle, a gear arranged concentric with the axle and connected thereto, a casing enclosing the axle, a frame mounted in the casing and surrounding the axle and being pivoted to the casing on an axis extending diametrically relatively to the axis of the axle, a gear comprising a ring encircling the axle and meshing with said gear and being pivoted to the frame on a transverse axis extending crosswise of the axis of the axle and at a right angle to the axis of the frame, and means within the casing and connected to the latter gear to move the same about said frame, substantially as and for the purpose specified.

3. A driving axle construction comprising an axle, a gear arranged concentric with the axle and connected thereto, a casing enclosing the axle, a frame mounted on the casing and surrounding the axle and being pivoted to the casing on an axis extending diametrically relatively to the axis of the axle, a gear comprising a ring encircling the axle and meshing with said gear and being pivoted to the frame on a transverse axis extending crosswise of the axis of the axle and at a right angle to the axis of the frame, and means within the casing and connected to said gear ring to move the same about its transverse axis and about the axis of said frame, said means being mounted on and rotatable about the axle and having cam means arranged about the axis of the axle and eccentric thereto and coacting with the latter gear ring, substantially as and for the purpose set forth.

4. A driving axle construction comprising two sections, differential gearing connecting the sections and including a driving gear, a casing, driving means including a member located in the casing and mounted on one of the sections and rotatable about the same, and means for transmitting motion from the driving member to said driving gear, said means comprising a wobble gear supported in the casing and meshing with said driving gear, the wobble gear encircling the axis of the axle and having a hub connected eccentrically to the driving member, substantially as and for the purpose specified.

In testimony whereof, I have hereunto signed my name, at Syracuse, in the county of Onondaga, and State of New York, this 3rd day of October, 1919.

ALEXANDER T. BROWN.